United States Patent [19]

Kurtz et al.

[11] Patent Number: 4,672,354
[45] Date of Patent: Jun. 9, 1987

[54] FABRICATION OF DIELECTRICALLY ISOLATED FINE LINE SEMICONDUCTOR TRANSDUCERS AND APPARATUS

[75] Inventors: Anthony D. Kurtz, Teaneck; Timothy A. Nunn, Ridgewood; Richard A. Weber, Denville, all of N.J.

[73] Assignee: Kulite Semiconductor Products, Inc., Ridgefield, N.J.

[21] Appl. No.: 804,761

[22] Filed: Dec. 5, 1985

[51] Int. Cl.[4] ................ H01L 21/306; B44C 1/22; G01B 7/16; H01C 17/00

[52] U.S. Cl. ..................................... 338/4; 29/25.35; 29/610 SG; 73/721; 73/727; 73/DIG. 4; 148/1.5; 148/187; 156/630; 156/631; 156/633; 156/644; 156/653; 156/657; 156/659.1; 156/662; 338/42; 357/26

[58] Field of Search ............... 156/629, 630, 631, 633, 156/644, 647, 648, 649, 650, 652, 653, 657, 659.1, 661.1, 662; 148/1.5, 187, 33.2, 33.3; 357/26; 338/2, 4, 36, 42; 29/610 R, 25.35, 610 SG; 73/708, 715, 720, 721, 726, 727, DIG. 4

[56] References Cited

U.S. PATENT DOCUMENTS

| | | | |
|---|---|---|---|
| 3,819,431 | 6/1974 | Kurtz et al. | 156/645 |
| 3,951,707 | 4/1976 | Kurtz et al. | 156/657 |
| 4,016,644 | 4/1977 | Kurtz et al. | 29/610 SG |
| 4,204,185 | 5/1980 | Kurtz et al. | 28/610 SG |
| 4,481,497 | 11/1984 | Kurtz et al. | 338/2 |
| 4,523,964 | 6/1985 | Wilner et al. | 148/33.2 |

*Primary Examiner*—William A. Powell

*Attorney, Agent, or Firm*—Arthur L. Plevy

[57] ABSTRACT

There is disclosed apparatus and methods of fabricating a piezoresistive semiconductor structure for use in a transducer. According to one method, a layer of silicon dioxide is grown over the surface of a first semiconductor wafer which is designated as a carrier wafer. A layer of glas is then formed on the top surface of the carrier wafer over said layer of silicon dioxide. A second wafer has diffused therein a high conductivity semiconductor layer which is diffused on a top surface of a sacrificial semiconductor wafer. The first and second wafers are then bonded together by means of an electrostatic bond with the high conductivity layer of the sacrificial wafer facing the glass layer of the first wafer. After securing the wafers together, one may etch away the remaining portion of the sacrificial wafer to provide a high conductivity resistive layer which is secured to the glass layer of the first wafer and is patterned to form a resistive network using standard photolithographic making. In another embodiment, the sacrificial wafer is processed by means of a high conductivity diffusion procedure whereby a resistive line pattern is formed in the second wafer. After diffusion, the second wafer is etched so that the high conductivity pattern projects from the top surface. This top surface consisting of the projected high conductivity resistive pattern is then bonded to the glass layer of the second wafer. After bonding the two wafers together, the unwanted N-type regions of the sacrificial wafer are etched away using a conductivity selective etch to form the resistive pattern.

20 Claims, 17 Drawing Figures

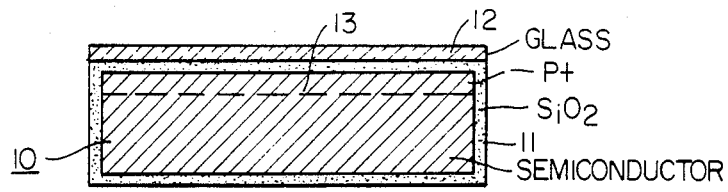
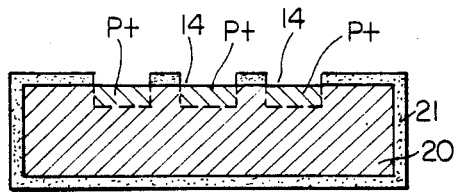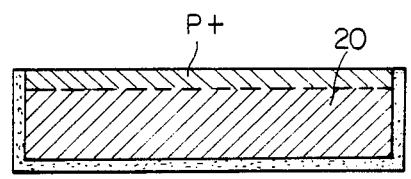
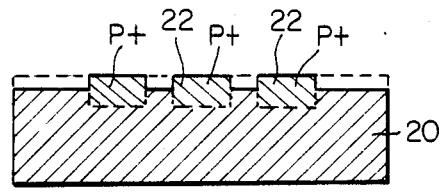
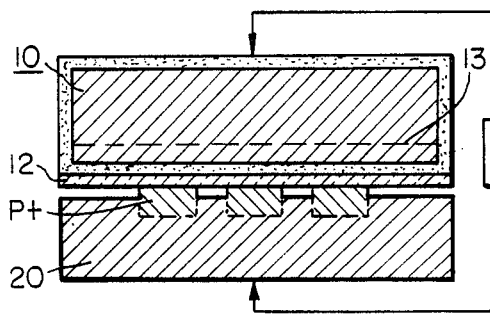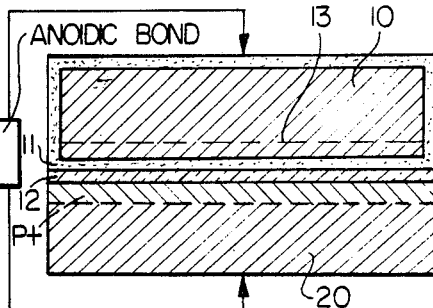
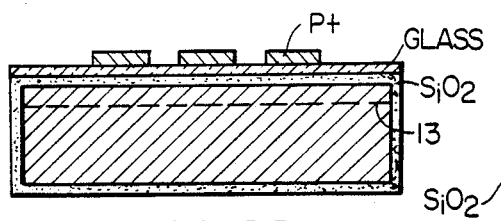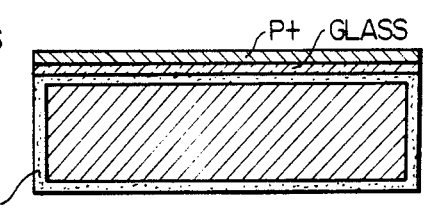

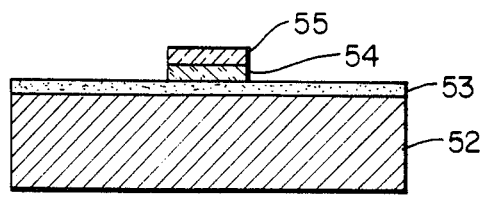
F I G. 9
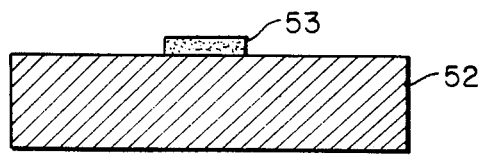
F I G. 10
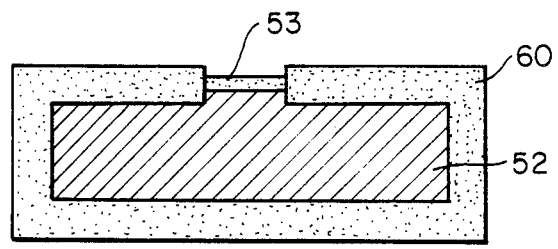
F I G. 11
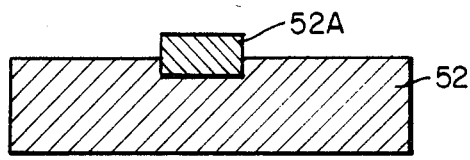
F I G. 12

FABRICATION OF DIELECTRICALLY ISOLATED FINE LINE SEMICONDUCTOR TRANSDUCERS AND APPARATUS

BACKGROUND OF THE INVENTION

This invention relates to semiconductor transducers in general and more particularly to such transducer assemblies which employ piezoresistive elements, which elements are dielectrically isolated from their respective diaphragms while utilizing high concentration doped layers.

Presently, semiconductor transducers, because of their relatively small dimensions, are finding wide use in a variety of applications. These devices, although being extremely small, possess high reliability and increased response. Such devices are widely utilized in the medical field, the electronics field, and various other fields for making pressure measurements. It is, of course, understood that for many stringent applications, great care has to be taken in providing a small and reliable device while making the device as sensitive as possible. In regard to this, certain applications require that the piezoresistive elements be dielectrically isolated from the diaphragm on which they are located. The piezoresistive transducer employs a silicon resistive element, which resistance varies according to the intensity or magnitude of an applied force upon an associated diaphragm. Such resistors comprise serpentine or tortuous line patterns. As is known, the greater the length of the pattern, the larger the resistor. In any event, it is a desire to form a long line pattern in a relatively small space, which line pattern possesses a relatively narrow width. It is further desirable to provide such a pattern, which is essentially a fine line pattern, in a small space where further the piezoresistive element is dielectrically isolated from the semiconductor diaphragm that it is coupled to. The piezoresistive element, as indicated, varies resistance according to the intensity of an applied force. The force is usually applied to a relatively thin semiconductor diaphragm or metal diaphragm which is a membrane-like structure and to which the semiconductor gauge is mounted or otherwise diffused therein. A force applied to the diaphragm serves to deflect the diaphragm and hence causes the associated piezoresistive element to vary resistance in accordance with the deflection. The force being measured is transferred through the diaphragm to the strain responsive element, causing the element to expand or compress. This produces a change in the resistance of the element. Such elements are conventionally arranged as Wheatstone bridge circuits with one to four of the bridge legs being active. Essentially, it is an increased desire of the prior art to produce a device that is relatively small, sensitive and which possesses a fairly large resistance in a relatively small area as well as being dielectrically isolated from the diaphragm. There are techniques employed and known in the prior art for the fabrication of dielectrically isolated transducer elements. See, for example, U.S. Pat. No. 3,951,707 by A. D. Kurtz et al. issued on Apr. 20, 1976 and assigned to the assignee herein, which patent is entitled "Method for Fabricating Glassbacked Transducers and Glassbacked Structures." In this technique there is disclosed a method of fabricating a thin ribbon piezoresistive bridge which eventually is to be secured to a thin glass wafer or the diaphragm structure. See also, U.S. Pat. No. 3,800,264 entitled "High Temperature Transducers and Housing Including Fabrication Methods" issued on Mar. 26, 1974 to A. D. Kurtz et al. and assigned to the assignee herein. This patent describes a dielectrically isolated pressure transducer which includes a silicon diaphragm having on a surface a piezoresistive sensor which is isolated from the diaphragm surface by a dielectric insulator.

See also U.S. Pat. No. 4,510,621 issued on Apr. 16, 1985 and entitled "Dielectrically Isolated Transducer Employing Single Crystal Strain Gages" by A. D. Kurtz et al. and assigned to the assignee herein. This patent shows a single crystal semiconductor diaphragm dielectrically isolated by a layer of silicon dioxide from a single crystal gage configuration. The methods employ high dose oxygen which is ion implanted into a monocrystalline wafer to form a buried layer of silicon dioxide with the top surface of the wafer being monocrystalline silicon.

U.S. Pat. No. 4,406,992 entitled "Semiconductor Pressure Transducers or Other Products Employing Layers of Single Crystal Silicon" issued on Sept. 27, 1983 to A. D. Kurtz et al. and assigned to the assignee herein. This patent shows a single crystal silicon sensor positioned on a single crystal diaphragm and isolated by a layer of silicon dioxide.

Apart from the aspect of dielectrically isolating the transducer, it is a further desire to produce a single crystal sensor which is dielectrically isolated from a single crystal substrate. In providing a single crystal substrate, one can now have a semiconductor diaphragm which is single crystal, thus avoiding many of the disadvantages associated with polycrystalline diaphragms as well as with polycrystalline sensor elements.

It is further desirable to provide a piezoresistive transducer which has a very small temperature coefficient and which possesses a narrow line width resistive pattern to enable large value resistors to be fabricated on relatively small diaphragms.

It is also desirable to provide a semiconductor transducer whereby the sensor device is dielectrically isolated from the structure.

L. Bruce Wilner, is an article entitled "Miniature Pressure Transducers For Use to 300° C." published in the *ISA JOURNAL*, 1982 ISBN 0-87664-689-5, has described a method of providing a structure with some of these desirable features but the method of fabrication and the resulting structure has a number of shortcomings. Wilner teaches that one should take a first wafer which is the carrier wafer and first form diaphragm apertures on one surface and oxidize the other surface. He then teaches that one should take a second wafer which has been diffused to a relatively high doping of boron. He then suggests that the two wafers are joined "by an oxide diffusion bond in which a very thin film of low-melting oxide on one wafer wets the interface between the wafers and at very high temperatures dissolves and diffuses into a thicker film of silicon dioxide on the second, or carrier wafer".

This process requires very high temperatures, 1000° C. or more, high pressures and long times and results in a structure with doubtful adherence between the two wafers. Moreover, because of the long times and temperatures required, redistribution of the diffused layer into the sacrificial wafer may occur. In any event, Wilner then indicates that the N type material should be removed from the sacrificial wafer and an appropriate gage pattern formed on the resulting p type layer now adhered to the carrier wafer. This requires an etching operation to remove the excess p type material thus forming a serpentine gage or sensor pattern.

An object of this invention is to overcome many of the difficult costly and critical features of Wilner's process. For instance, it would be desirable to form the bond between sacrificial and carrier wafer in seconds rather than days at a low temperature of 350° C., rather than high temperature, under low rather than high pressures.

It is also an object of this invention to produce very fine line geometry such as obtained with conventional oxide masking rather than that which is obtained with chemical removal.

It is a further object of this invention to preserve the very highly doped sensor configuration rather than to allow it to be degraded by further high temperature processing.

It is a further object to provide a semiconductor transducer which possesses a small temperature coefficient over a large operating range and which possesses narrow line width resistors to enable the fabrication of large resistance values on small diaphragms.

BRIEF DESCRIPTION OF THE FIGURES

FIG. 1 is a cross-sectional view depicting a semiconductor wafer utilized as a carrier wafer according to the techniques described in this invention.

FIG. 2-A is a cross-sectional view depicting a diffusion process employed in this invention.

FIG. 2-B is a cross-sectional view depicting another step utilized in this invention.

FIG. 2-C is a cross-sectional view showing the bonding of a carrier wafer to a processed sacrificial wafer according to this invention.

FIG. 2-D is a cross-sectional view showing a partial transducer structure according to this invention.

FIG. 3-A is a cross-sectional view depicting a step in an alternate method according to this invention.

FIG. 3-B is a cross-sectional view depicting the bonding of the sacrificial wafer of FIG. 3-A to the carrier wafer of FIG. 1.

FIG. 3-C is a cross-sectional view showing the resultant wafer according to this invention.

FIGS. 6 to 12 are a series of cross-sectional views showing a solution of the problem depicted in FIG. 5.

DESCRIPTION OF PREFERRED EMBODIMENT

Figure 4:
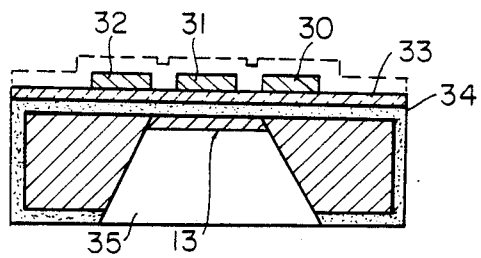
FIG. 4 is a cross-sectional view showing the resultant transducer fabricated according to the methods depicted in FIGS. 2-A to 2-D or in FIGS. 3-A to 3-C.

A semiconductor transducer structure comprising a first carrier semiconductor wafer having a top composite surface including a first layer of a silicon compound disposed on said surface with a layer of Pyrex glass disposed on said silicon compound, with a bottom surface having an aperture extending towards said top composite surface and defining an active area for deflection, a resistive pattern bonded to said glass layer and comprising single crystal very high conductivity semiconductor material.

DETAILED DESCRIPTION OF THE FIGURES

Referring to FIG. 1, there is shown a cross-sectional view of a treated carrier wafer 10. The original wafer 10 may be fabricated from a semiconductor material, such as N-type silicon, and is preferably a single crystal structure. The wafer 10 may be circular or rectangular in the top plan view. Essentially, such wafers are commercially available and are well known in the art. The wafer 10 may be approximately 2.0-5 inches in diameter and approximately 3-10 mils in thickness. Hence as one can determine, the wafer is relatively thin. According to the method to be described, the wafer 10 is treated so that a layer of silicon dioxide or silicon nitride is grown on all surfaces of the wafer. The growth of such layers as silicon dioxide or silicon nitride is well known in the art and is described in many typical references. A typical technique for providing a layer of silicon dioxide is implemented by heating the wafer 10 to a temperature between 1,000°-1,300° C. and passing oxygen or steam over the surface for growing the layer of silicon dioxide. The layer of silicon dioxide is designated by reference numeral 11. After growing the layer of silicon dioxide 11 on the semiconductor wafer 10, a thin layer of glass, (1 mil or less) such as Pyrex glass, is then sputtered, deposited, or otherwise formed on the top surface of the wafer. The glass layer 12, as will be subsequently explained, as well as the oxide, acts as the dielectric base for isolating the semiconductor sensor from the diaphragm. The thin glass layer allows one to make the necessary bond or seal, while both layers act as one dielectric isolating layer with this function being primarily performed by the silicon dioxide. Also shown in FIG. 1 is a dashed line 13 which appears in the portion of the semiconductor wafer 10 underlying the layer of silicon dioxide. Essentially, as will be explained, the wafer 10 may be first treated by a diffusion technique whereby high conductivity semiconductor material is deposited within the original wafer 10 prior to forming the silicon dioxide layer. This high conductivity region may in certain embodiments define the eventual thickness for the semiconductor diaphragm employed in the transducer. The wafer 10 depicted in FIG. 1 is designated as a carrier wafer and, as will be explained, essentially forms the diaphragm portion of the completed transducer arrangement. Thus the wafer 10 depicted in FIG. 1 is eventually bonded to another wafer which contains the semiconductor resistive pattern. Before proceeding with a detailed explanation, it is noted at the onset that two different techniques will be described to form a composite transducer according to this invention.

The first technique is shown in FIGS. 2-A to 2-D, whereas the second technique is shown in FIGS. 3-A to 3-C. The first technique employs a second wafer 20 designated as a sacrificial wafer which is masked and treated in such a manner that a semiconductor pattern is deposited upon the wafer. The second technique differs from the first technique in that the sacrificial wafer 20 is first treated with a high concentration doping technique and thereafter is joined to the carrier wafer, and after being treated, the resistor pattern is then formed by etching away unwanted material upon the joined structure to form the desired resistive pattern. Essentially, the resultant structure formed by either technique according to this invention is depicted in FIG. 4. It is believed that a brief description of the resultant transducer structure according to the methods to be described is warranted.

Referring to FIG. 4, there is shown a transducer sensor array designated as 30 located on a glass layer 33. The array 30 consists of a serpentine array or a bridge pattern of piezoresistive elements, such as 31 and 32, which are secured to the glass substrate 33. The elements as 31 and 32 are highly doped P+ piezoresistive devices which have been formed, as will be explained by highly doped P layers provided in the treated semiconductor wafer. The pattern formed by the piezoresistors as 31 and 32 defines a semiconductor resistive element which can be an extremely fine line pattern, as it is implemented by diffusion techniques. Such techniques can produce line patterns having widths of one-tenth to one mil. The resistive pattern as 31 and 32 is positioned and bonded directly to a glass layer 33. Underlying the glass layer 33 is a layer of silicon dioxide 34 which is a thin layer and which is formed on the carrier wafer 10 as, for example, that wafer shown in FIG. 1.

The carrier wafer 10 is then etched to form a central aperture 35, which aperture defines an active diaphragm area. The thickness of the diaphragm may be of any desired thickness depending upon the etching of the aperture 35, which aperture can be implemented by an isotropic or an anisotropic etching technique. The thickness of the diaphragm can also be determined by a P+ layer which can be diffused in the original carrier wafer 10, as briefly described in conjunction with FIG. 1. Thus the structure shown in FIG. 4 is a composite transducer having a highly doped semiconductor resistive pattern 31, which essentially is of a monocrystalline orientation and which is dielectrically isolated from the carrier wafer 10 by means of a glass layer 33 overlying the silicon dioxide layer 34. It is noted that both layer 33 and 34 are extremely thin compared to the thickness of the resulting diaphragm.

Referring to FIG. 2-A, there is shown a step according to one method of fabricating the composite device as shown in FIG. 4. It being understood that the carrier wafer 10 of FIG. 1 is utilized in both processes to be described. In FIG. 2-A there is shown a cross-sectional view of a second sacrificial wafer 20, also of a suitable semiconductor material as silicon. Basically, the sacrificial wafer 10 may be circular or rectangular in the top plan view. As indicated above, such wafers are commercially available and are well known in the art. The sacrificial wafer 20 may be approximately 3–5 inches in diameter and approximately 3–10 mils in thickness and may be the same size as the carrier wafer 10 shown in FIG. 1. The sacrificial wafer 20 has grown on the top surface a layer of silicon dioxide 21. It is well known to use a layer of silicon dioxide to allow one to diffuse various impurities into the sacrificial wafer 20. This is accommodated by the formation of a semiconductor pattern which is implemented by the use of photomasks and photochemical or photolithographic techniques. Briefly, the use of such techniques is also well known in the semiconductor art and involves the use of a photoresist or lacquer which is coated over the oxide layer 21. The thickness of the photoresist may be on the order of several thousand Angstroms. The photoresist having the desired thin line resistive pattern impressed upon it is then exposed to ultraviolet light which causes the photoresist to harden according to the pattern on the mask. These techniques are well known. Once the pattern is impressed, windows 14 are formed via the photoresist pattern. The N-type sacrificial wafer 20 has the line pattern diffused via the openings 14 in the silicon dioxide layer 21. This is a P-type diffusion. Essentially, the P-type diffusion is accommodated by the use of high concentration, P-type impurities. The formation of highly doped P layers in an N-type semiconductor is also well known. In order to produce highly doped P-type layers, one uses a diffusion technique utilizing high boron concentration to produce a highly doped P layer or P+ regions 22. The pattern which defines this semiconductor resistive elements is an extremely fine line pattern as being implemented by diffusion, and therefore, such a technique can produce line patterns having widths of 0.1 to 1.0 mils. These patterns can be accurately controlled due to the advances made in the diffusion process, and further, the use of diffusion controls the spreading of line widths. Based on the diffusion process which results in highly doped P layers, one achieves a relatively small temperature coefficient for the final device. The P regions are designated on FIG. 2A as P+ regions and are shown as buried regions within the N-type material on the sacrificial wafer 20. At the end of the step of diffusion, there is no further high temperature processing so no further redistribution of P-type material into the carrier wafer 20 is possible.

Referring to FIG. 2-B, the next step in the procedure is depicted. After formation of the highly doped P-type resistive pattern, the oxide layer 21 is removed, and the N-type silicon wafer is then etched to reduce the thickness at the top surface. The etching is done by a conductivity selective etch. Such etches are well known, and there are etchants such as hydrazine which selectively attack the low conductivity N-type material without etching or in any manner attacking the high conductivity P+ layer. The techniques for etching silicon are well known in the art. See, for example, a series of papers published in the *IEEE Transactions on Electron Devices*, October 1978, Vol. ED-25. See also U.S. Pat. No. 4,204,185 entitled "Integral Transducer Assemblies Employing Thin Homogeneous Diaphragms" issued on May 20, 1980 to A. D. Kurtz et al and assigned to the assignee herein.

According to the method, the material from the N-type wafer is etched away to about one half the depth of the diffusion to produce the structure shown in FIG. 2-B. Hence in FIG. 2-B it is immediately ascertained that there exists a raised pattern on the wafer 20, which pattern consists of projecting P+ regions which have been previously diffused into the N-type wafer 20.

Referring to FIG. 2-C, it is shown that the treated sacrificial wafer 20 of FIG. 2-B is then secured to the glass layer 12 of the carrier wafer 10 of FIG. 1. This is accomplished by means of an electrostatic bonding technique. Such bonding techniques are well known. For example, see U.S. Pat. No. 4,040,172 entitled "Method of Manufacturing Integral Transducer Assemblies Applying Built-In Pressure Limiting" issued on Aug. 9, 1977 to A. D. Kurtz et al. and assigned to the assignee herein. The bond, whether it be deemed an anodic or an electrostatic bond, is formed by applying an electrical current through the composite structure under low pressure and low heat (about 300° C.) thus bonding the P+ regions to the glass layer 12 of the carrier wafer 10.

The next step is depicted in FIG. 2-D whereby the entire sacrificial wafer 20, apart from the projecting P+ region, is then etched by an etching bath whereby the entire low conductivity N region is now etched away. The etching of low conductivity type silicon is well known, and there are many etchants which will attack the N-type layer without attacking the highly doped P+ layer 22. A typical etchant includes hydrazine as well as other materials. As one can see from FIG. 2-D, the remaining structure comprises a highly doped resistive pattern which is intimately bonded to a glass layer which is positioned on an intermediate layer of silicon dioxide.

Referring again to FIG. 4, the original carrier wafer 10 is then treated to form the aperture 35. As indicated, the carrier wafer 10 may first be diffused over its entire surface with a highly doped P+ region. In this manner, the depth of the P+ region will determine the diaphragm thickness. Hence one can etch the aperture 35 in the wafer by means of an isotropic or an anisotropic etch and utilizing materials which will attack the lower conductivity region of wafer 10 and which will not attack the P+ region to thus define the active diaphragm thickness. In any event, it is also understood that the doping of wafer 10 with the P+ region need not be accommodated in order to fabricate the device shown in FIG. 4. The structure shown in FIG. 4 can, of course, be further treated as to now deposit metal layers on the P+ regions to form metal contact areas or terminals for the resultant transducer structure. The deposition of metal or silicon is also well known. The metal contact areas can be defined by conventional photoresists or a chemical etching process and may be deposited by vapor deposition, chemical plating, electrolytic plating, and so on. See, for example, U.S. Pat. No. 3,819,431 issued on June 25, 1974 entitled "Method of Making Transducers Employing Integral Protective Coatings and Supports" by A. D. Kurtz et al. and assigned to the assignee herein. Once the metal layer terminals are formed, one has a complete transducer structure as depicted in FIG. 4. The composite structure of FIG. 4 consists of a highly doped P+ resistive array having a large resistance with narrow line widths. Due to the use of highly doped P-diffusion and dielectric isolation, the resultant device is extremely stable over a wide temperature range. See also U.S. Pat. No. 3,800,264, previously cited above. Moreover, because of the elimination of further high temperature processing, one preserves the excellent stability inherent in highly doped P+ regions. The value of the P+ resistors can be accurately controlled due to the diffusion technique. The process thus described allows one to manufacture highly stable P+ resistive elements in a relatively simple manner by using a diffusion technique with accurate line width control and by using a composite layer of glass and silicon dioxide to dielectrically isolate the P+ resistive pattern from the diaphragm member. The technique also allows one to accurately control the thickness of the diaphragm and further gives one the ability to use an isotropic or an anisotropic etch in regard to the aperture 35. Thus one can achieve apertures with either angled sidewalls depending on the particular application for the transducer.

The second technique according to this invention is very similar to the technique above described and is best depicted by reference to FIGS. 3-A. In FIG. 3-A, the wafer 20 is first subjected to a shallow diffusion technique whereby the entire top surface is diffused with a highly doped P+ layer, thereby producing a highly doped region on the top surface of wafer 20.

Referring to FIG. 3-B, the wafer 20 having the top diffused highly doped P+ layer is then secured to the carrier wafer 10 by means of the glass layer 12. Both wafers are held in contact with the P+ layer of wafer 20 contacting the glass layer of wafer 10. An anodic bond secures the wafer 20 to the wafer 10 at the junction between the glass layer 12 and the P+ layer. Thus as shown in FIG. 3-B, the remainder of wafer 20 is selectively removed by a selective conductivity etch, whereby the structure in FIG. 3-C is obtained. The structure in FIG. 3-C has the carrier wafer 10 with the glass layer on the top secured to the P+ layer by means of the bond. The resistive pattern is now formed in the P+ layer by conventional photomasking or photolithographic techniques to thus form the resistive array which is similar to the resistive array which is similar to the resistive array shown, for example, in FIG. 2-B. Hence any resistive pattern can be formed in the P+ layer to thereby provide a composite transducer as shown in FIG. 4. It is also noted that the entire device of FIG. 4 can be topped with a thin layer of glass which can be sputtered or otherwise emplaced thereon. Alternatively, a layer of silicon dioxide is sputtered over the entire pattern shown in FIG. 4 to further protect the sensors. Thus this layer of glass or layer of silicon dioxide is shown schematically in FIG. 4 by means of a dashed line. The advantages of the techniques shown regarding FIGS. 3-A to 3-C as compared to the techniques shown in FIGS. 2-A to 2-D are as follows. In forming the highly diffused P+ layers, after the selective etching as occurring in FIG. 2-B, it may be that the P+ layers are slightly concave, and hence when the wafer 20 having the projecting P+ regions is secured to the carrier wafer 10, such attachment may occur only at a portion due to the slightly concave surface of the P+ region which is caused by the diffusion process. The structure shown in FIG. 3-A prevents this, as the entire surface of the wafer 20 is treated with P-type diffusion; hence the bond between wafer 20 and 10 as implemented in FIG. 3-B is more secure. In any event, the embodiment of FIG. 3-B is not as preferable, as the line width based on diffusion of the P+ region cannot be held as closely or as finely as the line widths implemented directly with P+ diffusion in wafer 20 as shown in FIG. 2-A. In order to circumvent the problem regarding the concave nature of the P+ diffusion, the following procedure can be implemented.

Figure 5:
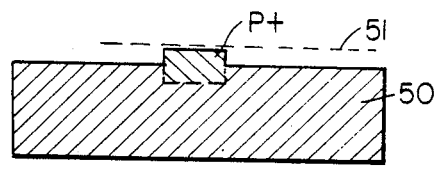
FIG. 5 is a cross-sectional view depicting a particular problem experienced when utilizing highly diffused P-type regions.

Referring to FIG. 5, the nature of the problem is disclosed in a highly enlarged view. Essentially, as seen from FIG. 5, a wafer 50 of semiconductor material has diffused therein a P+ region 51. Based on the diffusion process, the top surface of the P+ region 51 is concave with respect to a horizontal line 51. Hence as one can ascertain, when the raised P+ region 51 is placed in contact with the glass layer of a carrier wafer 10, adhesion may occur only at a portion, since the center portion is slightly depressed.

Figure 6:
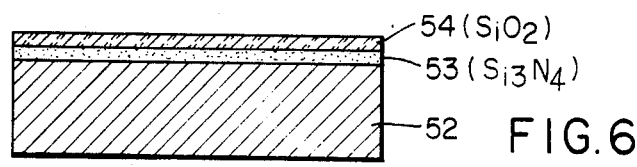

In order to avoid this problem, the wafer 52 as shown in FIG. 6 is first treated to form a layer 53 of silicon nitride. The layer of silicon nitrite may be 2,000 Angstroms thick. On top of the layer of silicon nitride, there is deposited a layer of silicon dioxide 54. The subsequent oxidation may give a layer of silicon dioxide of between 6,000 to 12,000 Angstroms. It is noted that both the growth or deposition of silicon nitrite and silicon dioxide are well known. It is also known that there are etches which will attack silicon dioxide and not attack silicon nitrite and vice versa. For example, one can utilize a buffered solution of hydrogen fluoride (HF) for attacking silicon dioxide and utilize a mask which is KPR to prevent etching of line patterns in the silicon dioxide. Alternatively, one employs phosphoric acid for silicon nitride utilizing a mask of silicon dioxide. Thus the phosphoric acid will attack the silicon nitride but will not attack the silicon dioxide.

The buffered HF solution will attack the silicon dioxide but will not attack the silicon nitride.

Figure 7:
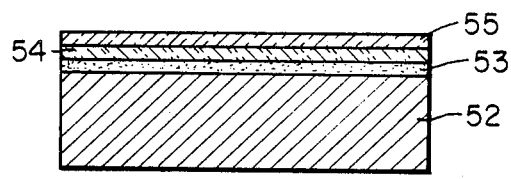

Referring to FIG. 7, a layer of photoresist is then deposited on top of the layer of silicon dioxide. The layer of photoresist is now patterned to form a resistive pattern in the photoresist layer. This is done by conventional photolithography technique and is well known. The resultant pattern is shown in FIG. 8, after etching away the unwanted silicon dioxide.

Figure 8:
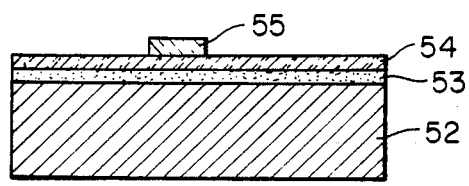

Thus as shown in FIG. 8, a line pattern 55 which consists of the photoresist deposited or otherwise bonded to the remaining portion of the layer of silicon dioxide. This is also shown in FIG. 9.

Referring to FIG. 10, the photoresist is now stripped leaving a layer of silicon dioxide 54 secured to the layer of silicon nitride 53. The nitride is then patterned based on using the silicon dioxide layer as a mask thus arriving at the structure of FIG. 10 which shows a line of silicon nitride secured to the surface of the semiconductor wafer 52.

The next step in the procedure is to now strip all oxide and then thermally grow an oxide coating 60 over the entire silicon wafer. It is noted that the oxide will not grow on the silicon nitride layer 53.

Thus as shown in FIG. 11, the layer of silicon nitride is depressed with respect to the oxide surface, that elevated with respect to the silicon surface. The thermally grown layer of silicon dioxide 60 reduces the effect of the wafer 52. The next step in the procedure is to remove the layer of silicon nitride and to diffuse into the resulting aperture P+ regions utilizing boron, the oxide acting as a mask. After the diffusion technique, the layer of oxide 60 is removed thus resulting in the structure shown in FIG. 12.

This structure has a raised projected area of P+ diffusion 52A which area has a flat-topped surface and hence can be more readily electrostatically or anodically bonded to the carrier wafer as for example shown in FIGS. 2-C and 3-B.

We claim:

1. A method of fabricating a piezoresistive semiconductor structure for use in a transducer comprising the steps of:
    (a) growing an insulating layer of a silicon compound over the surface of a first semiconductor wafer,
    (b) forming a layer of borosilicate glass on a top surface of said first wafer over said grown silicon compound,
    (c) diffusing a high conductivity semiconductor layer on a surface of a second semiconductor wafer,
    (d) electrostatically bonding said glass layer of said first wafer to said high conductivity layer of said second wafer,
    (e) etching away the remaining portion of said second wafer to provide a high conductivity layer secured to said glass layer of said first wafer.

2. The method according to claim 1, further including the step of forming a resistor pattern in said high conductivity layer prior to binding said glass layer to said second wafer, and etching said second wafer about said pattern to cause said pattern to project from the surface of said second wafer to thereby bond said glass layer to said projecting areas.

3. The method according to claim 1, further including the step of forming a resistive pattern on said high conductivity layer secured to said glass layer.

4. The method according to claim 1, further including the step of forming an aperture in said first semiconductor wafer on a surface opposite to that surface containing said glass layer with said aperture defining an active diaphragm region.

5. The method according to claim 1, wherein said high conductivity layer is a P-type layer of high concentration with said semiconductor wafer being a lower conductivity N-type wafer.

6. The method according to claim 1, wherein said step of growing a layer of a silicon compound includes growing a layer of silicon dioxide on said first wafer and then depositing a layer of glass over a surface of said first wafer.

7. The method according to claim 1, wherein said step of growing a layer of a silicon compound includes growing a layer of silicon nitride of said first wafer.

8. The method according to claim 3, including the step of first diffusing a high conductivity layer into a surface of said first wafer prior to growing a layer of silicon compound over said surface, wherein said high conductivity layer determines the thickness of the active area of said diaphragm formed by said aperture.

9. The method according to claim 1, wherein the step of etching includes etching with a conductivity selective etch.

10. The method according to claim 1, wherein the step of diffusing includes diffusing P-type semiconductor material, including boron, into said second wafer.

11. the method according to claim 1, further including the steps of first growing a layer of silicon nitride on said second wafer, then growing a layer of silicon dioxide on said wafer, forming a resistive line pattern in said nitride layer, etching away said silicon dioxide to form a raised silicon nitride pattern regrowing a layer of silicon dioxide and then etching away said nitride to form a raised silicon pattern and then diffusing high conductivity semiconductor material into said second wafer according to said raised pattern prior to securing said raised pattern to said glass layer.

12. The method to claim 8 where the thickness of the active area is formed by employing a conductivity selective etch which will preferably attack the lower conductivity semiconductor without substantially etching the higher conductivity layer.

13. The method according to claim 2, wherein said resistor line pattern exhibits line widths between 0.1 to 1 mils.

14. The method according to claim 1, wherein said first and second wafers are monocrystalline semiconductors.

15. A semiconductor transducer structure comprising:
    a first carrier semiconductor wafer having a top composite surface including a first layer of an insulating silicon compound disposed on said surface with a layer of barosilicate glass disposed on said silicon compound, with a bottom surface having an aperture extending towards said top composite surface and defining an active area for deflection,
    a resistive pattern bonded to said glass layer and comprising single crystal high conductivity semiconductor material.

16. The semiconductor transducer structure according to claim 15, wherein said first layer of a silicon compound is silicon dioxide.

17. The semiconductor transducer structure according to claim 15, wherein said high conductivity material is P+ semiconductor material.

18. The semiconductor transducer according to claim 15, wherein said resistive pattern is bonded to said glass layer by means of an electrostatic bond.

19. The seimconductor transducer structure according to claim 15, further including a glass layer covering said resistive pattern.

20. The semiconductor transducer structure according to claim 15, further including a silicon dioxide layer covering said resistive pattern.

* * * * *